(12) United States Patent
Barron et al.

(10) Patent No.: US 8,211,991 B1
(45) Date of Patent: Jul. 3, 2012

(54) THERMO-GELLING MATRICES AND RELATED METHODS FOR MICROCHANNEL DNA SEQUENCING

(75) Inventors: Annelise E. Barron, Evanston, IL (US); Cheuk-Wai Kan, Chicago, IL (US)

(73) Assignee: Northwestern University, Evanston, IL (US)

( * ) Notice: Subject to any disclaimer, the term of this patent is extended or adjusted under 35 U.S.C. 154(b) by 0 days.

(21) Appl. No.: 12/699,294

(22) Filed: Feb. 3, 2010

Related U.S. Application Data

(62) Division of application No. 11/174,082, filed on Jun. 30, 2005, now Pat. No. 7,682,497.

(60) Provisional application No. 60/584,415, filed on Jun. 30, 2004.

(51) Int. Cl.
*G01N 27/447* (2006.01)
*C08F 20/56* (2006.01)

(52) U.S. Cl. ............... 526/303.1; 204/450; 204/469

(58) Field of Classification Search .............. 204/455, 204/469, 451; 585/7, 10, 12; 521/25; 525/8; 526/303.1
See application file for complete search history.

(56) References Cited

U.S. PATENT DOCUMENTS 5,883,211 A   3/1999   Sassi et al.
6,706,162 B1  3/2004   Voss et al.

OTHER PUBLICATIONS

Wada et al. Macromolecules, 1992, 7220.*

Liang, D; Chu, B. High Speed Separation of DNA Fragments by Capillary Electrophoresis in Poly(ethyleneoxide)-poly(propylene oxide)-poly(ethylene oxide) Triblock Polymer. Electrophoresis, 1998, 2447-2453, vol. 9.

Rill, RL; Liu, Y; Van Winkle, DH; Locke, BR. Pluronic Copolymer Liquid Crystals: Unique, Replaceable Media for Capillary Gel Electrophoresis. J. Chromatogr. A., 1998, 287-295, vol. 817.

Epperson, JD; Dodge, J; Rill, RL; Greenbaum, NL. Analysis of Oligonucleotides and Unincorporated Nucleotides from In Vitro Transcription by Capillary Electrophoresis in Pluronic F127 Gels. Electrophoresis, 2001, 771-778, vol. 22.

Liu, Y; Locke, BR; Van Winkle, DH; Rill, RL. Optimizing Capillary Gel Electrophoretic Separations of Oligonucleotides in Liquid Crystalline Pluronic F127. J. Chromatogr. A, 1998, 367-375, vol. 817.

Liang, D; Song, L; Zhou, S; Zaitsev, VS; Chu, B. Poly(N-isopropylacrylamide)-g-(ethyleneoxide) for High Resolution and High Speed Separation of DNA by Capillary Electrophoresis. Electrophoresis, 1999, 2856-2863, vol. 20.

Liang, D; Song, L; Zhou, S; Zaitsev, VS; Chu, B. Copolymers of Poly(N-isopropylacrylamide) Densely Grafted with Poly(ethylene oxide) as High-Performance Separation Matrix of DNA. Macromolecules, 1999, 6326-6332, vol. 32.

Kan, CW; Doherty, EAS; Barron, AE. A Novel Thermogelling Matrix for Microchannel DNA Sequencing Based on Poly-N-alkoxyalkylacrylamide Copolymers. Electrophoresis, 2003, 4161-4169, vol. 24.

Rill, RL; Locke, BR; Liu, Y; Van Winkle, DH. Electrophoresis in Lyotropic Polymer Liquid Crystals. Proc. Ntl. Acad. Sci. USA, Feb. 1998, 1534-1539, vol. 95.

Liang, D; Chu, B. High Speed Separation of DNA Fragments by Capillary Electrophoresis in Poly(ethylene oxide)-poly(propylene oxide)-poly(ethylene oxide) Triblock Polymer. Electrophoresis, 1998, 2447-2453, vol. 19.

(Continued)

*Primary Examiner* — Alex Noguerola
*Assistant Examiner* — Gurpreet Kaur
(74) *Attorney, Agent, or Firm* — Reinhart Boerner Van Deuren s.c.

(57) ABSTRACT

Polymeric compounds and related methods and apparatus, as can be used in a wide range of RNA and DNA separations.

3 Claims, 4 Drawing Sheets

*N*-methoxyethylacrylamide (NMEA)

*N*-ethoxyethylacrylamide (NEEA)

OTHER PUBLICATIONS

Rill, RL; Liu, Y; Van Winkle, DH; Locke, BR. Pluronic Copolymer Liquid Crystals: Unique, Replaceable Media for Capillary Gel Electrophoresis. J. Chromatogr. A, 1998, 287-295, vol. 817.

Epperson, JF; Dodge, J; Rill, RL; Greenbaum, NL. Analysis of Oligonucleotides and Unincorporated Nucleotides from In Vitro Transcription by Capillary Electrophoresis in Pluronic F127 Gels. Electrophoresis, 2001, 771-778, vol. 22.

Liu, Y; Locke, BR; Van Winkle DH; Rill, RL. Optimizing Capillary Gel Electrophoretic Separations of Oligonucleotides in Liquid Crystalline Pluronic F127. J. Chromatogr. A,1998, 367-375, vol. 817.

Liang, D; Song, L; Zhou,S; Zaitsev, VS; Chu, B. Poly(N-isopropylacrylamide)-g-poly(ethyleneoxide) for High Resolution and High Speed Separation of DNA by Capillary Electrophoresis. Electrophoresis, 1999, 2856-28630, vol. 20.

Liang, D; Zhou, S; Song, L; Zaitsev, VS; Chu, B. Copolymers of Poly(N-isopropylacrylamide) Densely Grafted with Poly(ethylene oxide) as High-Performance Separation Matrix of DNA; Macromolecules, 1999, 6326-6332, vol. 32.

Kan, CW; Doherty, EAS; Barron, AE. A Novel Thermogelling Matrix for Microchannel DNA Sequencing Based on Poly-N-alkoxyalkylacrylamide Copolymers. Electrophoresis, 2003, 4161-4169, vol. 24.

Rill, RL; Locke, BR; Liu, Y; Van Winkle, DH. Electrophoresis in Lyotropic Polymer Liquid Crystals. Proc. Natl. Acad. Sci. USA, Feb. 1998, 1534-1539, vol. 95.

* cited by examiner

N-methoxyethylacrylamide (NMEA)

N-ethoxyethylacrylamide (NEEA)

THERMO-GELLING MATRICES AND RELATED METHODS FOR MICROCHANNEL DNA SEQUENCING

This application is a divisional of and claims priority benefit from application Ser. No. 11/174,082 filed on Jun. 30, 2005 now U.S. Pat. No. 7,682,497 which claims priority to provisional application Ser. No. 60/584,415 filed Jun. 30, 2004, each of which is incorporated herein by reference.

The United States government has certain rights to this invention pursuant to Grant No. 1 R01 HG 019770-01 from the National Institutes of Health and Grant No. DMR-0076097 from the National Science Foundation, to Northwestern University.

BACKGROUND OF THE INVENTION

The introduction of capillary electrophoresis (CE), capillary array electrophoresis (CAE), and subsequently microchip electrophoresis (μCE) has revolutionized biomedical research. For example, the completion of the Human Genome Project (HGP), two years ahead of schedule, was, in part, made possible by the development of automated, high-throughput capillary array electrophoresis DNA sequencing instruments. While impressive achievements have been made for the HGP, other de novo sequencing projects, for the comprehensive, comparative genetic analysis of humans as well as of agriculturally and industrially important plants, animals, insects, and microorganisms, will continue. Success of these efforts may well hinge on the development of microchip-based DNA sequencing systems that operate with replaceable polymer solutions for DNA separation—and the resulting easy automation and excellent reproducibility.

Size-dependent DNA separation is a most critical process in genome analysis. It is well-known that DNA mobility is size-independent in free-solution electrophoresis, because of the constant DNA charge-to-mass ratio. In a microchannel system (e.g., using fused silica capillaries of i.d. 50-100 μm), size-dependent electrophoretic DNA separation has been achieved, employing fluid, entangled polymer solutions such as water soluble cellulose derivatives polyethylene oxide copolymers or N-substituted acrylamide polymers. Usually, highly entangled solutions of high-molar-mass polymers are required for long DNA sequencing read lengths (the number of bases read without error in one single run). To date, the best sequencing performance has been obtained with ultra-high-molar-mass linear polyacrylamide (LPA) (molecular weights >10 million g/mole), prepared by inverse emulsion polymerization. Such a sieving network can produce up to 1000 bases in about 1 hour and 1300 bases in 2 hours under highly optimized CE and sample conditions (including optimized polymer molar mass distribution, matrix formulation, temperature, electric field, sample preparation and purification, injection, and base-calling algorithm), with routine performance of commercial LPA matrices at read lengths of about 600-800 bases.

Such LPA matrices, while highly effective for DNA separation, suffer from several drawbacks, in particular, high viscosity and lack of wall-coating ability. The extreme viscosity of high-molar-mass LPA solutions requires high pressure to initiate flow of the solution into microchannels. The necessity for high-pressure matrix replacement contributes significantly to the building and maintenance costs of microchannel electrophoresis instruments. Moreover, the low pressure tolerance of most plastic or glass chips (20-100 psi) prohibits such high-pressure loading for microfluidic devices. Another deficiency associated with LPA matrices is the need for wall modification to suppress electro-osmotic flow (EOF). Suppression of EOF promotes reproducible and efficient separations by eliminating wall-analyte interactions. Therefore, despite excellent DNA sieving performance, LPA does not fulfill criteria of an optimal sequencing matrix. Lower-viscosity, self-coating polymer matrices, such as poly-N,N-dimethylacrylamide (PDMA), polyethylene oxide (PEO) and polyvinylpyrrolidone (PVP), are available and have been used, but provide much shorter read lengths than LPA.

The development of polymeric matrices with "switchable viscosities" is one strategy to decouple the capillary loading and DNA separation properties. For example, "thermo-thinning" polymer networks undergo a thermodynamically driven volume-phase transition, accompanied by a dramatic decrease in viscosity, in response to a change in temperature over a narrow range. The temperature at which this phase transition occurs is termed the lower critical solution temperature (LCST) or the "cloud point" of the solution, and is characterized by a sharp increase in turbidity of the polymer solutions. Poly-N-isopropylacrylamide (pNIPA), with an LCST in water of 32° C., and hydroxypropylcellulose (HPC), with an LCST in water of 39° C., have been used as thermo-responsive sieving matrices for double-stranded (ds) DNA separations. Thermo-thinning polymer networks with designed LCSTs, based on linear copolymers of N,N-dimethylacrylamide (DMA) and N,N-diethylacrylamide (DEA), have been formulated as DNA sequencing matrices with a thermally controlled "viscosity switch." In particular, a copolymer composed of 42% (w/w) DEA and 58% (w/w) DMA delivered 575 bases in 94 minutes with a base-calling accuracy of 98.5%. This copolymer network exhibits a dramatic drop in viscosity, of more than an order of magnitude, when heated above 80° C., which allows rapid matrix loading into the capillary lumen under very low applied pressure (50 psi). Upon reducing the temperature to below the LCST (to the sequencing temperature of 44° C.), the entangled state of the polymer coils in solution is restored as they redissolve in aqueous solution, providing effective DNA sequencing performance.

Another interesting class of polymer matrices shows "thermo-thickening" behavior: these polymer networks exhibit an upper critical solution temperature (UCST) at which an expansion of coil volume occurs, accompanied by thermo-association of polymer chains and a dramatic increase in viscosity. Thermo-gelation is thus actuated with an increase in temperature. An advantage of thermo-gelling networks is that they can be designed to allow microchannel loading at room temperature, and then heated to the sequencing temperature to gel. A number of thermo-thickening polymer matrices have been developed based on polymers that exhibit thermo-associative behavior, with novel co-polymer architectures such as poly-N-isopropylacrylamide-graft-polyethylene oxide (pNIPA-g-pEO), poly-N-isopropylacrylamide-graft-polyacrylamide (pNIPA-g-LPA), and polyethylene oxide-polypropylene oxide block copolymers (pEO-pPO-pEO). These polymers utilize the self-associating properties of the hydrophobic chain parts, which serve as physical crosslinking points, to form extended polymer networks when heated above the transition temperature. While it has been shown that these thermo-thickening polymer matrices can provide high-resolution dsDNA separations, single-base resolution of ssDNA under denaturing conditions (7 M urea, high temperature), as required for DNA sequencing, has not yet been presented in the literature for a thermo-gelling matrix.

SUMMARY OF THE INVENTION

In light of the foregoing, it is an object of the present invention to provide a range of polymer and copolymer compounds, compositions and/or related method(s) for their use in DNA separation and sequencing, thereby overcoming various deficiencies and shortcomings of the prior art, including those outlined above. It will be understood by those skilled in the art that one or more aspects of this invention can meet certain objectives, while one or more other aspects can meet certain other objectives. Each objective may not apply equally, in all its respects, to every aspect of this invention. As such, the following objects can be viewed in the alternative with respect to any one aspect of this invention.

It is an object of the present invention to provide one or more polymer/copolymer compounds and related gels or matrices for DNA resolution under denaturing conditions.

It can also be an object of this invention to provide one or more compounds, of the type described herein, for use in conjunction with the separation of long single strand DNA sequence read lengths of the sort useful in genome analyses.

It can also be an object of the present invention, alone or in conjunction with one or more or the preceding objectives, to provide one or more polymer/copolymer compounds with wall-coating ability, to eliminate or control wall-analyte interactions and suppress the electro-osmotic flow during DNA electrophoresis.

It can also be an object of the present invention to provide one or more polymer/copolymer compounds or aqueous compositions thereof for low-pressure loading, thereby reducing design and maintenance costs of microchannel electrophoresis instruments.

Other objects, features, benefits and advantages of the present invention will be apparent from this summary and the following descriptions of certain embodiments, and will be readily apparent to those skilled in the art having knowledge of various DNA separation techniques. Such objects, features, benefits and advantages will be apparent from the above as taken into conjunction with the accompanying examples, data, figures and all reasonable inferences to be drawn therefrom.

In part, the present invention can be directed to one or more poly-N-alkoxyalkylacrylamide compounds comprising monomers of a formula $CH_2CHC(O)NHXOR$ where X is a divalent alkyl moiety coupled to the alkoxy substituent, and R comprises an alkyl or substituted alkyl moiety, such monomers including, but not limited to $CH_2CHC(O)NHC_2H_4OCH_3$, such a compound of a molecular weight ranging from less than about 2 MDa to greater than about 5 MDa. Regardless of molecular weight, in certain embodiments, such a compound can be a polymer of N-methoxyethylacrylamide (NMEA), such a compound as can be copolymeric with N-ethoxyethylacrylamide (NEEA). Likewise, without regard to molecular weight, such a copolymer of NMEA and NEEA can comprise up to about 25 weight percent of NEEA. In certain other embodiments, such a copolymer can comprise up to about 10 weight percent NEEA. Molecular weights of such compounds can be determined as described herein.

Unless otherwise indicated, all numbers expressing properties such as molecular weight, weight percent and the like, used in the specification and claims, are to be understood as being modified in all instances by the term "about," Accordingly, unless indicated to the contrary, the numerical parameters in this specification and claims are approximations that can vary depending upon desired compound or system properties or results to be achieved using any method relating thereto, such molecular weights and weight percents as can be varied by those skilled in the art made aware of this invention.

With respect to any of the compounds, compositions, methods and/or apparatus of the present invention, the polymers and copolymers can suitably comprise, consist of or consist essentially of any of the aforementioned monomers, regardless of the weight percent of any such monomer in any corresponding polymer or copolymer. Each such polymer/copolymer compound or monomeric component thereof is compositionally distinguishable, characteristically contrasted and can be practiced in conjunction with the present invention separate and apart from another. Accordingly, it should also be understood that the inventive compounds, compositions, methods and/or apparatus, as illustratively disclosed herein, can be practiced or utilized in the absence of any one compound, monomer and/or step which may or may not be disclosed, referenced or inferred herein, the absence of which may or may not be specifically disclosed, referenced or inferred herein.

In part, the present invention can also be directed to a sol-gel system comprising a polymer of NMEA, $(CH_2CHC(O)NHC_2H_4OCH_3)_n$, in an aqueous medium, such a medium comprising a polymer comprising a monomers of NMEA and having a molecular weight ranging from about 2 MDa to about 4 MDa, to about 5 MDa or greater. As described above and illustrated below, such a system can comprise a copolymer of NMEA and NEEA. (See, FIG. 1) Without regarding to molecular weight, such a copolymer can comprise about 10 weight percent to about 25 weight percent NEEA. Without limitation as to any one monomeric or weight percent ratio, such a system can comprise a hydrogel at a temperature above about 35° C. Likewise, such a system can comprise a copolymer substantially in solution at about or less than room temperature, such a system as can be provided in a microchannel electrophoresis capillary component.

The present invention can also be directed to a method of using a sol-gel system of a poly-N-methoxyethylacrylamide for separation of any type of single- or double-stranded DNA or RNA fragments. Without regard to any particular order, such a method can comprise (1) providing a sol-gel system comprising a polymer of NMEA in an aqueous medium, with a molecular weight ranging from about 2 MDa to about 4 MDa or greater, and such a system further comprising a DNA sequencing buffer; (2) introducing such a system to either a microchannel DNA electrophoresis capillary or a microfluidic DNA sequencing chip, with a system at about room temperature; and (3) contacting a mixture of DNA and/or RNA components with the system, the system at a temperature above about 35° C., and at an applied voltage and for a time sufficient for electrophoretic separation of the mixture. In certain embodiments, such a polymer can consist essentially of NMEA monomers. In various other embodiments, such a polymer can comprise a copolymer of NMEA and NEEA. Without limitation, such copolymers can comprise up to about 25 weight percent NEEA. Regardless, polymers of this invention can separate DNA sequences (e.g., single-stranded DNA) of lengths up to about 600 to about 650 bases. Non-limiting examples of such a separation/sequencing methodology are provided below (example 3b).

As can relate to the preceding, this invention can also be directed to a microchannel DNA electrophoresis apparatus. Such an apparatus can comprise a substrate and a polymeric NMEA compound thereon (e.g., without limitation, adsorbed on, coupled to and/or connected therewith), such a compound of a molecular weight ranging from about 2 MDa to about 4 MDa or greater, with such a substrate selected from a micron-dimensioned capillary and a microfluidic sequencing chip. Without limitation to microchannel substrate or apparatus configuration, such a polymer can consist essentially of NMEA monomers. Alternatively, such a polymer can comprise up to about 25 weight percent NEEA monomers. While the polymers/copolymers of this invention have demonstrated wall-coating performance, such compounds can also be used in conjunction or combination with other types of capillary or microchannel wall coating materials known in the art, non-limiting examples of which are provided in example 2b, below.

As would be understood by those skilled in the art monomer levels of both NMEA and NEEA can vary depending upon separation performance required for a given application. Without limitation, useful NEEA levels can range from less than about 10% (w/w) to greater than about 25% (w/w), as may be required for adequate thermo-gelling behavior. From another perspective, this invention can also provide a method of using NMEA to enhance DNA separation. Such a method can comprise polymerizing NEEA with a component level of NMEA sufficient to provide copolymer hydrophilic character and desired sequencing performance at a particular base-calling accuracy. Without limitation, in one embodiment, a copolymer comprising about 90% (w/w) NMEA and about 10% (w/w) NEEA, with a molecular weight of ~2 MDa, delivers around 600 bases at 98.5% base-calling accuracy in 100 minutes of electrophoresis. Again, molecular weights and such levels of NMEA can vary without limitation and can be copolymerized with NEEA as would be understood by those skilled in the art made aware of this invention to meet a particular separation need or application. Likewise, in accordance with the broader aspects of this invention, various other copolymeric N-alkoxyalkylacrylamides can be employed consistent with the thermo-gelling and sequencing considerations discussed herein.

The present invention demonstrates that use of reversible, "thermo-gelling" polymer matrices allows easy separation matrix injection with low viscosity near room temperature, and good DNA separation performance via a sol-gel transition accessed by simply elevating the temperature (typically >about 35° C. to about 40° C., for DNA sequencing). Hence, automated, highly sensitive, and high-throughput DNA analysis can be achieved in microchannel electrophoresis, with the advantage of high-resolution and long read length typically obtained from slab-gel electrophoresis. The reversible nature of thermo-gelation enables the replacement of sieving matrix between runs, which eliminates the possibility for sample carry-over between analyses, and prevents problems that could arise from buffer salt depletion or polymer degradation under the typical CE conditions of high electric field and high pH. Finally, in contrast to most long-reading polymer matrices of the prior art with no wall-coating ability, additional surface deactivation procedures are not required to suppress electro-osmotic flow (EOF).

Accordingly, this invention includes a novel class polymers and copolymers and related polymeric, gels and matrices, which offer, without limitation, a combination of several desirable properties: excellent single-base resolution at extended read length with short analysis time; good sieving performance and easy injection into microchannels; and dynamic or absorptive wall-coating ability that eliminates the need for tedious and potentially irreproducible wall-coating procedures.

DETAILED DESCRIPTION OF CERTAIN EMBODIMENTS

As discussed above, this invention relates, in part, to a novel class of "thermo-gelling" polymer networks comprising various poly-N-alkoxyalkylacrylamides, and/or their use as DNA sequencing matrices for high-throughput microchannel electrophoresis in capillary arrays. In particular but without limitation, copolymers of N-ethoxyethylacrylamide (NEEA) and N-methoxyethylacrylamide (NMEA) were synthesized, as described more fully below, by aqueous-phase free-radical polymerization and characterized by tandem gel permeation chromatography-multi-angle laser light scattering. It was hypothesized that, at low temperature, a semidilute, uncrosslinked solution of pNEEA should form a solvent-swollen entangled network. A volume phase transition should then occur as polymer coils shrink by expelling solvent at increased temperature, and a drop in steady-shear viscosity would be expected to accompany this transition. A further increase in temperature should then lead again to a swollen state, and hence the re-formation of a robust entangled polymer network. To address problems of the prior art, copolymers of NEEA and N-methoxyethylacrylamide (NMEA), a more hydrophilic monomer with similar structure, could then be used to modulate and tune the rheological behavior, hydrophobicity, and optical properties of the polymer networks. Indeed, such representative copolymer compounds and/or matrices exhibit "re-entrant"-type volume phase transitions, forming entangled networks with high shear viscosity at low (typically <about 20° C.) and high (typically >about 35° C.) temperatures, and undergo a "coil-to-globular," lower critical solution temperature (LCST)-like phase transition over an intermediate temperature range (ranging from about 20-about 35° C.). Hence, matrix viscosity is relatively low at room temperature (about 25° C.), and increases rapidly above about 35° C.

The material properties and phase behavior of these thermo-gelling polymer networks were studied by steady-shear rheometry. These matrices are easily loaded into capillary arrays at room temperature while existing as viscous fluids, but thermogel above 35° C. to form transparent hydrogels via a thermo-associative phase transition. The extent of the intermediate viscosity drop and the final viscosity increase can depend on the composition of the copolymers. DNA sequencing by capillary array electrophoresis with 4-color LIF detection shows that these thermo-gelling networks provide enhanced resolution of both small and large DNA sequencing fragments and longer sequencing read lengths, in comparison to appropriate control (closely related, non-thermo-gelling) polymer networks.

Figure 2:
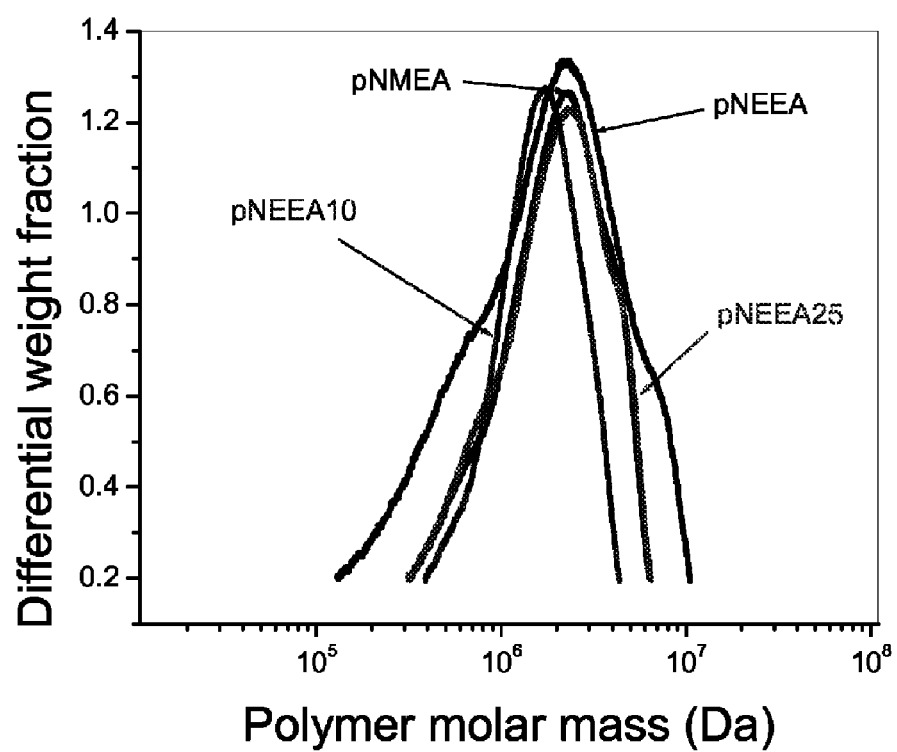
FIG. 2. Molar mass distributions of pNEE, pNMEA, pNEEA25, and pNEEA10 synthesized, as characterized by tandem GPC-MALLS.
Figure 3A:
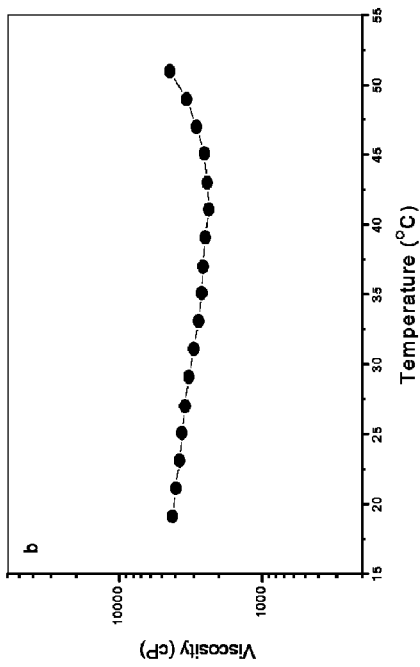
FIG. 3. Temperature-dependent viscosities of (A) pNEEA, (B) pNMEA, (C) pNEEA25, and (D) pNEEA10 in 1×TTE/7 M urea solution at 7% (w/v) concentration. Experiments were performed with temperature control in a cone-and-plate fixture (diameter 25 mm; angle 2°) at a heating rate of ~2° C./min. Applied shear rate was 1 s-1.
Figure 3B:
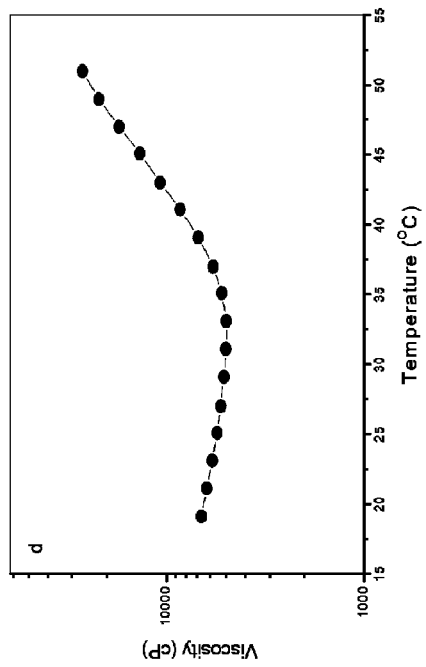
Figure 3C:
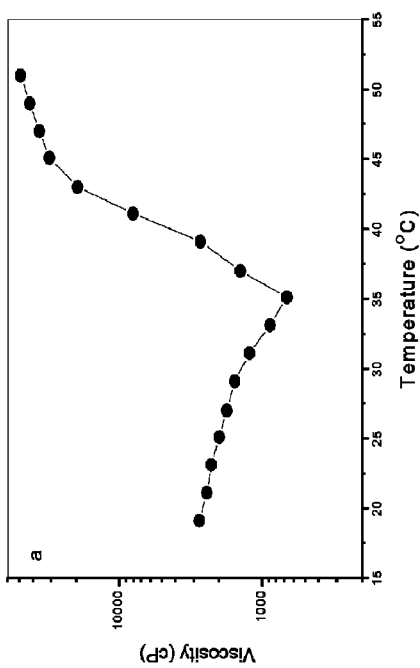
Figure 3D:
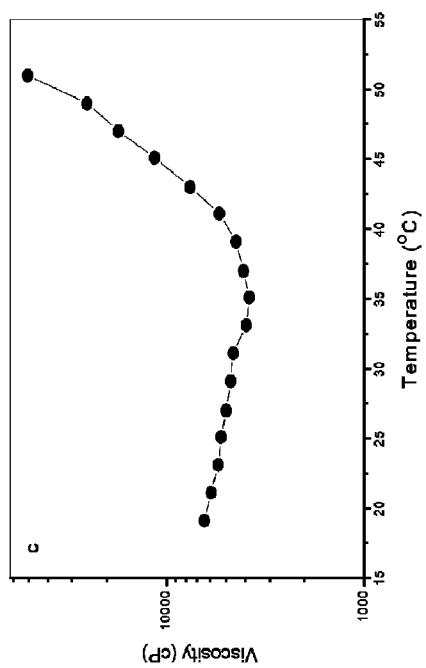

As mentioned, polymers synthesized were characterized by tandem GPC-MALLS to determine the weight-average molar mass ($M_w$), weight-average radius of gyration ($R_g$), and polydispersity index (PDI) of each sample. FIG. 2 illustrates the molar mass distributions of four polymer samples, including 100% NMEA (pNMEA), 75% (w/w) NMEA/25% (w/w) NEEA (pNEEA25), and 90% (w/w) NMEA/10% (w/w) NEEA (pNEEA10). The physical properties of these representative polymers and copolymers are summarized in Table 1. Molecular weights of the matrices are ~2 MDa and are well matched, to facilitate a good comparison of properties and performance.

TABLE 1

Physical properties of NMEA and NEEA polymers and copolymers

| Polymer | Weight-average molar-mass, $M_w$ (MDa)* | Polydispersity index* (PDI) | Measured $R_g$ (nm)* |
|---|---|---|---|
| 100% NEEA (pNEEA) | 2.38 | 3.12 | 70.2 |
| 100% NMEA (pNMEA) | 2.16 | 1.92 | 117.8 |
| 75% NMEA/25% NEEA (pNEEA25) | 2.17 | 1.97 | 106.8 |
| 90% NMEA/10% NEEA (pNEEA 10) | 1.98 | 1.45 | 107.2 |

*Data represent the average of the results from three analyses.

Prior research has shown that matrices composed of high-molar mass polymers (Mw >10 MDa) are best suited to provide ultra-long DNA sequencing read lengths (1000 bases or more in 1-2 hours). More "typical" read lengths of 500-700 bases can be obtained with prior art linear polymers with Mw ranging from 2-5 MDa. An advantage of matrices based on lower-Mw polymers is their lower viscosities, which make capillary loading easier. Nonetheless, with hopes for long read lengths, free-radical solution polymerization conditions were adjusted to produce NMEA/NEEA copolymers with the highest achievable molar mass. Both NMEA and NEEA are vulnerable to crosslinking during polymerization at high monomer concentrations (>5% (w/v)) and/or at high temperatures (>40° C.). However, with careful control of polymerization conditions (lower temperature (25° C.) and with lower monomer concentrations (1% (w/v)), linear copolymers with Mw ~2-3 MDa were obtained. Synthesis of higher molar mass NMEA/NEEA copolymers by inverse emulsion polymerization was attempted, as has been illustrated in the literature for the case of linear polyacrylamide (LPA), however, the hydrophobic character of the copolymers inhibited adequate recovery from the emulsion by precipitation in organic solvent.

The polymers pNEEA, pNMEA, pNEEA25, and pNEEA10 (as designated in Table 1) were each dissolved in DNA sequencing buffer (1×TTE, 7 M urea), and their temperature-dependent rheological behavior was studied. FIGS. 3A-D show viscosity as a function of temperature for these polymers, between 20° C. and 55° C. All four of these polymer matrices show distinct thermo-responsive behaviors. The expected "re-entrant"-type phase transition behavior is observed for linear pNEEA (FIG. 3A), as with the crosslinked hydrogel counterpart reported in the literature. The "shrinking" behavior at intermediate temperatures can be attributed to weak hydrophobic interactions of the alkoxyalkyl groups, while at higher temperatures, thermal mixing was hypothesized to dominate over hydrophobic interactions, leading to the subsequent swelling. Remarkably, even in 7M urea, transitions in phase occur at about the same temperatures observed for the crosslinked disk in pure water. Between 20° C. and 35° C., viscosity drops from 3000 to ~600 cP; then between 35° C. and 45° C., viscosity jumps rapidly up to ~20,000 cP, and then climbs towards a plateau of ~60,000 cP as temperature is increased further. This is the "thermo-gelling" phase transition. On the other hand, pNMEA shows less thermo-responsive behavior, and only when heated above ~45° C. (FIG. 3B), with a minor upturn in viscosity that might indicate the start of a phase transition which would mature at higher temperature. For the purpose of further evaluation, in which the sequencing performance of these matrices was compared at 44° C., pNMEA was used as a "control" network, to compare the effects of thermo-gelling and non-thermo-gelling behavior on DNA separation.

Table 2 summarizes the DNA sequencing read lengths which were achieved in 100-minute electrophoretic separations with 98.5% base-calling accuracy, using the polymers and copolymers of NMEA and NEEA as sieving matrices. As discussed above, the hydrophobicity of pNEEA was believed to impede effective DNA separation. Also, the increased turbidity that occurs at the "re-entrant" phase transition of pure pNEEA disallows sensitive detection of fluorescently labeled DNA molecules in this matrix. Hence, the read length achieved with pNEEA was generally less than 100 bases (data not shown). On the other hand, a polymer matrix based on 100% NMEA, a more hydrophilic network, provides good sequencing performance, however, with a relatively short read length of 450 bases at 98.5% accuracy, under the conditions tested.

Accordingly, a range of copolymers of NMEA and NEEA can be used, without limitation, to minimize matrix hydrophobicity but, at the same time, harness the thermo-responsive behavior of the NEEA co-monomer. Copolymers of NMEA and NEEA provide good DNA sequencing performance, even better than that of pNMEA homopolymers: for instance, pNEEA25 gave a 490-base read, and pNEEA10 gave a 600-base read, both at 98.5% base-calling accuracy. Without limitation to any one theory or mode of operation, the improved performance of the copolymers relative to the more hydrophilic pNMEA is believed due, at least in part, to the thermo-gelling behavior of the copolymers, which provides better DNA resolution via physical stabilization of the polymer networks. Hence, the copolymer networks combine the fluid behavior of a linear, entangled polymer solution at room temperature with the static, non-deformable nature of crosslinked hydrogels at sequencing temperatures, and provide a significantly extended read length relative to what can be achieved in pure, non-thermo-gelling pNMEA. However, because pNEEA exhibits substantial hydrophobicity at high temperature, a lower amount of NEEA incorporated into the copolymer (e.g., about 10% vs. about 25%) can be beneficial to DNA separation. A copolymer formulation can, optimally, comprise a sufficient fraction of the NEEA monomer for thermo-gelling behavior without undue hydrophobicity. Further optimization of the polymer molar mass, molar mass distribution and composition can provide additional matrix performance improvements.

Likewise, there are other, possible routes to improving the performance of these thermo-gelling networks. As shown in the temperature-dependent viscosity data, the transition temperature of the pNEEA10 copolymer solution is close to 40° C. While further temperature increase showed no sign of creating a viscosity plateau, it is possible that with a temperature >44° C. a more strongly associated polymer network would be formed, with better DNA sieving achieved at a sequencing temperature of 50° C. or beyond. It has been shown in the literature that the optimal DNA sequencing temperature lies between 50 and 60° C. The highest achievable sequencing temperature of the MegaBACE 1000™ system used, herein, is 44° C., but does not limit the use and application of these thermo-gelling matrices.

Figure 4:
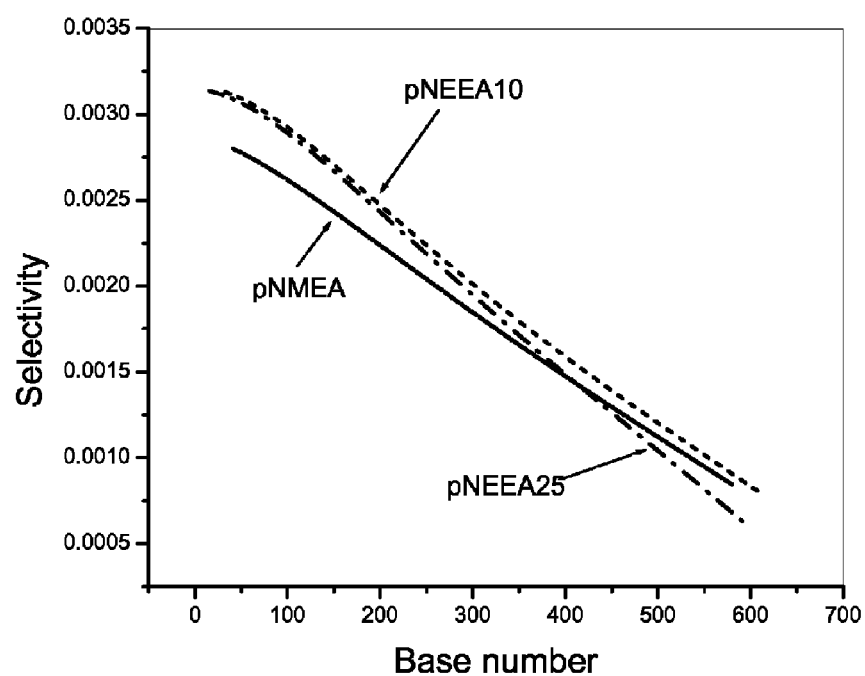
FIG. 4. Selectivity vs. base number for pNMEA (–); pNEEA25 ((–··–)); and pNEEA10 ( - - - ) matrices, for the CAE separation of M13mp18 MegaBACE DNA sequencing standards. Separation was achieved in 7% (w/v) copolymer in 50 mM Tris/50 mM TAPS/2 mM EDTA buffer with 7 M urea, at 140 V/cm and 44° C.

Finally, base-calling accuracy can be improved substantially with custom mobility shift corrections for the four different, base-specific dyes, as the base-caller used is "trained" to account for matrix-specific mobility shifts for LPA, a very hydrophilic polymer with chemical structure very different from the poly-N-alkoxyalkylacrylamide network of this invention. The DNA sequencing performances of different polymer matrices can be quantified to identify matrix-specific factors that limit read length, and to provide guidance towards the formulation of optimal matrix and CE conditions. Plots of migration time vs. base number for the different polymer matrices were derived from the electropherograms, and fitted with a third-order polynomial. The polynomial functions were then used to calculate the selectivity of DNA separation ($\Delta\mu/\mu_{avg}$) according to the following equation:

$$\left|\frac{\Delta\mu}{\mu_{avg}}\right| = 2\left|\frac{t_{m1} - t_{m2}}{t_{m1} + t_{m2}}\right|$$

where $t_m$ is the migration time of the DNA sequencing peak of interest. FIG. 4 shows plots of selectivity vs. DNA base number for the three interesting polymer matrices (excluding pNEEA which gave <100 bases). Selectivity for small-base number DNA was higher than that for large-base number DNA for each matrix, decreasing with DNA size with a roughly linear dependence. The selectivity of the pNEEA10 copolymer matrix is generally highest, as is consistent with our anticipation based on the balance of retaining thermo-gelling behavior with the minimum polymer hydrophobicity. The selectivity of the pNEEA25 matrix is lower than that of pNMEA for DNA larger than 400 bases, probably due to the hydrophobic effect. The pNEEA10 matrix, however, performs better than pNMEA at high base numbers, possibly because of thermo-gelation. The significantly higher selectivity we observe for small DNA fragments in both copolymer networks suggests that other than high-throughput sequencing, which usually requires high resolution of larger DNA fragments (i.e., >500 bases), these thermo-gelling polymer networks should be ideal for other genomic analyses such as minisequencing or dsDNA analysis for PCR fragment sizing or microsatellite analysis. Note that no significant drop in the slopes of these selectivity plots was observed for any of the three matrices as a function of DNA size, which indicates that the read length is not limited by diminishing selectivity, as would be reflected by a plateau of migration time, which was not observed (data not shown). The absence of a migration time plateau suggests that biased reputation is not occurring in these matrices over this DNA size range; therefore, a longer read length may be obtainable with the optimization of other parameters.

TABLE 2

DNA sequencing read length obtained in different matrices

| Polymer | Read length at (98.5% accuracy) |
| --- | --- |
| 100% NEEA (pNEEA) | <100 |
| 100% NMEA (pNMEA) | 450 |
| 75% NMEA/25% NEEA (pNEEA25) | 490 |
| 90% NMEA/10% NEEA (pNEEA10) | 600 |

Coincidentally, it was found that copolymers of this invention possess a good adsorptive wall-coating ability, and hence could be used as a "self-coating" matrix to suppress EOF. The electroosmotic mobility ($\mu$eo) of coated capillary was $5.53 \times 10^{-10}$ m2/V-cm, versus $1.5 \times 10^{-8}$ m2/V-cm for an uncoated capillary, representing a reduction in electro-osmotic mobility of over 2 orders of magnitude.

EXAMPLES OF THE INVENTION

The following non-limiting examples and data illustrate various aspects and features relating to the compounds, systems and/or methods of the present invention, including preparation and use of NMEA polymers and copolymers. In comparison with the prior art, the present compounds and methods provide results and data which are surprising, unexpected and contrary thereto. While the utility of this invention is illustrated through the use of several polymer compounds, compositions and related DNA sequencing methods, it will be understood by those skilled in the art that comparable results are obtainable with various other copolymeric compounds, with monomeric component levels and corresponding weight percent ratios limited only by thermo-gelling behavior and sequencing performance required for a given application.

Example 1a

Figure 1:
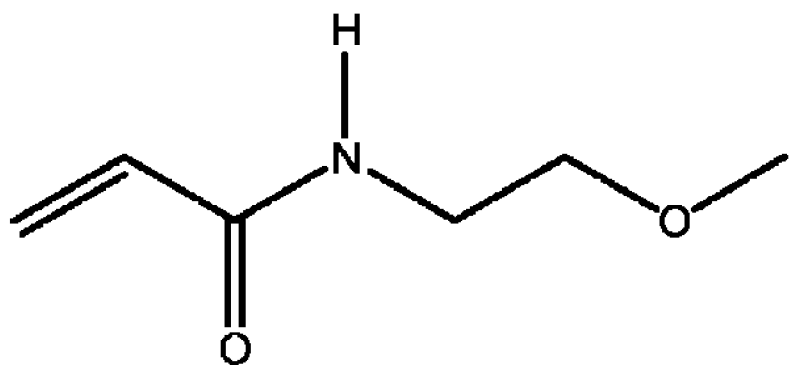
FIG. 1. Structures of N-methoxyethylacrylamide (NMEA) and N-ethoxyethylacrylamide (NEEA).
Figure 1:
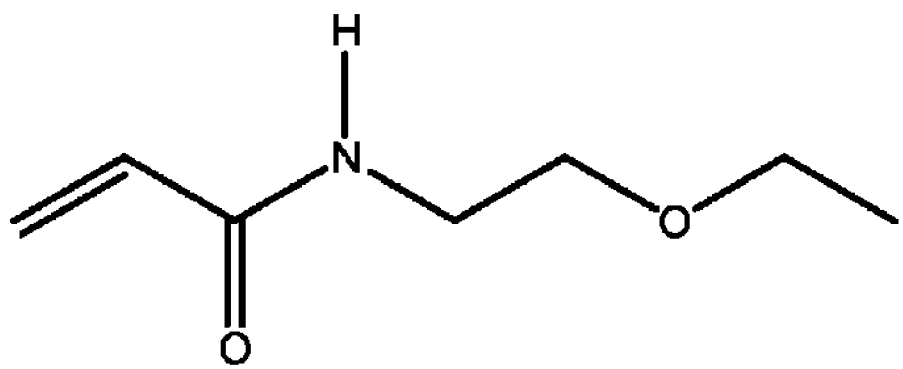

The structures of NMEA and NEEA monomers are shown in FIG. 1 and the corresponding polymers can be represented by the aforementioned formula. Ultrapure (>99.5% pure) NMEA and NEEA (Monomer-Polymer and Dajac Labs, Inc., Feasterville, Pa., USA) were polymerized and copolymerized at different monomer ratios, as shown, in an aqueous solution (1% (w/v) total monomer concentration), thermostated at 25° C., and degassed with nitrogen prior to initiation. The reactions were initiated with 0.5 µL per mL of monomer solution of a 10% (w/v) ammonium persulfate (APS) solution in water and 0.1 µL per mL of monomer solution of N,N,N',N-tetramethylethylenediamine (TEMED) (both, Amresco, Solon, Ohio, USA). After 24 h, the resulting mixtures were removed from the water bath, poured into 100,000 molecular weight cutoff cellulose ester membranes (Fisher Scientific, Pittsburgh, Pa., USA), and dialyzed against deionized, distilled water for 10 days with frequent water changes. The polymer solutions were then frozen and lyophilized using a freeze-drying system (Labonco, Kansas City, Mo., USA), resulting in a stiff, white, foam-like polymer mass that was then redissolved in aqueous buffer by slow rotation overnight (Roto-Torque, Cole-Parmer Instrument Co., Inc., Vernon Hills, Ill., USA).

Likewise, various other polymers/copolymers of the sort described herein can be prepared, as described above or using straight-forward modifications of such procedures—as would be understood by those skilled in the art. For instance, a higher molar mass polymer, e.g., 4 MDa pNMEA, can be prepared as follows: Ultrapure (>99.5%) N-methoxyethylacrylamide (NMEA) (Monomer-Polymer Dajac Labs, Inc., Feasterville, Pa., USA) were polymerized by aqueous-phase free-radical polymerization. An aqueous solution with 7% (w/v) total monomer concentration, was thermostatted at 47 C, and degassed with nitrogen prior to initiation. Initiator V-50 (2,2'-azobis(2-amidinopropane) dihydrochloride) (Wako Chemical USA, Inc., Richmond, Va., USA) was dissolved in water and injected into the reaction flask. After 16 h, the resulting mixture was allowed to come to room temperature, poured into 100 kDa molecular weight (MW) cutoff cellulose ester membranes (Spectrum Laboratories, Inc., Rancho Dominguez, Calif., USA), and dialyzed against deionized, distilled water for 10 days with frequent water changes to remove unreacted monomer and low-MW polymer. The polymer solution was then frozen and lyophilized (Labconco, Kansas City, Mo., USA), resulting in a white, stiff, foam-like polymer material that was then redissolved in aqueous electrophoresis buffer by slow rotation overnight at room temperature (Roto-Torque, Cole-Parmer Instrument Co., Inc., Vernon Hills, Ill., USA). The same polymers were used as DNA sequencing matrices at a concentration of 5% (w/v) in 0.5×TTE with 7M urea.

Other compounds of this invention can be prepared, analogously, and are provided below.

TABLE 3

| Polymer | $M_w$(MDa) |
|---|---|
| pNMEA | 1.5, 5.0 |
| 97% NMEA/3% NEEA | 1.75, 2.0 |
| 95% NMEA/5% NEEA | 1.5. 4.0,4.5 |
| 90% NMEA/10% NEEA | 2.5, 3.5 |
| 80% NMEA/20% NEEA | 1.8, 4.0 |
| 75% NMEA/25% NEEA | 3.0, 5.0 |

Example 1b

The molar mass distributions of the NMEA polymer and NMEA/NEEA copolymers were determined by first fractionating the polymer samples by gel permeation chromatography (GPC) prior to analysis by on-line multi-angle laser light scattering (MALLS) and refractive index detection, using a Waters 2690 Alliance Separations Module (Milford, Mass., USA) with Shodex (New York, N.Y., USA) OHpak columns SB-806 HQ, SB-804 HQ, and SB-802.5 HQ connected in series. In this tandem GPC-MALLS mode, the effluent from the GPC systems flows into the DAWN DSP laser photometer and Optilab interferometric refractometer (both, Wyatt Technology, Santa Barbara, Calif., USA). Sample aliquots of 100 µL (sample concentration, 0.5 mg/mL) were injected into the system (mobile phase 0.1 M NaCl, 50 mM NaH2PO4, and 200 ppm NaN3; flow rate 0.30 mL/min) The tandem GPC-MALLS data were processed with ASTRA® for Windows® software from Wyatt Technology.

Example 1c

The copolymer composition was determined by 1H NMR spectroscopy with a Varian Invoa 500 (Walnut Creek, Calif.). The steady-shear and temperature-dependent viscosities of the polymer solutions were measured with a Paar Physica MCR rheometer (Ashland, Va., USA) equipped with a cone-plate geometry (diameter 25 mm, angle 2°). The polymers were dissolved in sequencing buffer consisting of 50 mM tris(hydroxymethyl)aminomethane (Tris), 50 mM N-tris(hydroxymethyl)methyl-3-aminopropane-sulfonic acid (TAPS), and 2 mM ethylenediaminetetraacetic acid (EDTA) (1×TTE) (Amresco, Solon, Ohio, and Sigma, St. Louis, Mo., USA) containing 7 M urea (Amresco) (0.5×TTE, 7 M urea, pH 8), at concentrations typically used in the DNA sequencing experiments. Steady-shear viscosity at different rates of applied shear (from $0.01\ s^{-1}$ to $1000\ s^{-1}$) was measured. Temperature-dependent viscosity was measured at a constant shear rate of $1\ s^{-1}$ and at a heating rate of ~2° C./min.

Example 2a

Wall-Coating Ability of the Polymer and Copolymer Matrices. Measurement of the electro-osmotic velocity (µeo) in fused silica capillaries, after treatment with a range of polymer and copolymer solutions, was carried out using a Beckman P/ACE 5000 instrument (Fullerton, Calif.) with a literature method. (See, Williams, B. A.; Vigh, G. *Anal. Chem.* 1996, 68, 1174-1180). The coating procedure involved pretreating the capillary inner wall with 1 M NaOH for 5 min, followed by washing with 0.1 M NaOH for 5 min A polymer solution dissolved in water with concentration of either 0.1% (w/w), 0.5% (w/w), or 1.0% (w/w) was flushed through the capillary for 15 min. To measure µeo, the capillary was flushed with background electrolyte (BGE) for 5 min. Next, a solution of dimethylformamide (DMF) marker was injected by hydrodynamic pressure (0.5 psi) for 1 s. The marker band was pushed inside the capillary by BGE under pressure for 90 s. A second marker band was injected for 1 s and pushed by BGE for 90 s. Then the neutral marker migrates towards the cathode when a separation voltage of 100 V/cm was applied for 5 min. A third marker band was injected for 1 s after the electric field dropped to zero. Finally, the capillary was flushed with BGE to move the three marker bands past the UV detector set at 254 nm, and the migration time of each band was recorded. µeo was then calculated, as referenced.

Example 2b

While the results of the preceding example demonstrate the use of such thermogelling polymers/copolymers as "self-coating" media (i.e., with no other separately applied capillary or microchannel wall coating), such compounds of this invention can also be utilized in combination with one or more prior art wall coatings, for example, covalently applied wall coatings or physically adsorbed wall coatings with polymers having a different monomer chemistry. Examples of such covalently applied wall coatings include but are not limited to polymers based substantially on acrylamide or dimethylacrylamide or hydroxyethylacrylamide monomers. Adsorptively applied or "dynamically" applied polymer wall coatings could include but are not limited to poly-N,N-dimethylacrylamide, poly-N-hydroxyethylacrylamide, or wall coatings based on naturally derived (e.g. cellulose-derived) polymers. Other coating materials will be recognized by those skilled in the art made aware of this invention.

Example 3

DNA Sequencing. DNA sequencing was performed on a MegaBACE 1000™ capillary array electrophoresis (CAE) system (Amersham Biosciences, Sunnyvale, Calif., USA), equipped with 4-color laser-induced fluorescence detection and 96 fused-silica capillaries (6 arrays of 16 capillaries with 75-µm inner diameter, 64-cm total length, 40-cm effective length) covalently coated with linear polyacrylamide e.g., pNEEA 10 and 4 MDa pNMEA. A 1×TTE, 7 M urea buffer was used to dissolve the matrix polymers to desired concentrations. The DNA samples used were aliquots of the MegaBACE DNA sequencing standard (Amersham Pharmacia, Piscataway, N.J., USA) consisting of M13mp18 DNA sequencing reaction products fluorescently labeled with Amersham ET dyes. Sequencing matrix was loaded into the capillaries under an applied pressure of 1000 psi for 200 s, followed by a polymer relaxation time of 20 min and a pre-run electrophoresis for 5 min at 140 V/cm and 44° C. After electrokinetic sample injection (46 V/cm, 40 s), the DNA was electrophoresed at 140 V/cm and 44° C. (the highest temperature achievable for our instrument). DNA sequencing electropherograms showed separation of the standards. Four-color laser-induced fluorescence data were collected, analyzed, and translated into DNA sequence (e.g., an average of 600-650 bases, with 4 MDa pNMEA) using the MegaBACE 1000™ DNA sequencing software version 2.0.

Commensurate with the foregoing, this invention can be utilized in the separation of any type of single- or double-stranded DNA or RNA fragment, including double-stranded DNA fragments (such as PCR products, restriction fragment length polymorphisms (RFLPs) or DNA heteroduplexes), single-stranded DNA (such as DNA sequencing fragments, forensic DNA samples, genotyping samples, including the products of a single-base extension reaction, or other DNA or RNA conformers (such as single-stranded DNA conformational polymorphism samples). It would be understood by one skilled in the art that the polymeric media of this invention, which function well for DNA sequencing applications, can also be used for the size-, or conformation-based separation of DNA or RNA species of a wide range of types, and that the fundamental advantages of these media can be the extended irrespective of the sample being separated or analyzed.

Example 4

DNA separation, and sequencing, can also be accomplished in conjunction with a glass microchip. A pressure-loading device was designed and constructed to facilitate the rapid injection of polymeric sieving matrix solutions into a chip microchannel. Briefly, this apparatus comprises two metal plates that are held together by a pneumatic press (Model No.: 4350, Fred S. Carver Lab., Wabash, Ind., USA). Stacks of neoprene rubber gaskets (McMaster-Carr, Atlanta, Ga., USA) are placed between these two plates and thereby form a chamber that is metal on the top and bottom and rubber on the edges. The intermediate rubber gaskets (those that are not in contact with the metal plates) have sections cut out of them to accommodate the microfluidic device. Additionally one of the metal plates has a tube drilled through to its center that allows a nitrogen line to pressurize the chamber formed between the two plates. To fill the microfluidic channels, a small bead of polymeric matrix is placed into one of the access ports or wells, and the microfluidic system is mounted into the loading apparatus. The end of the microfluidic device containing the polymer matrix is placed into the pressurized chamber and the end of the microfluidic device containing other ports was located outside of the chamber. Upon the application of pressure (typically ~150 psi), the polymeric matrix was forced out to the other ports and the channel is thereby loaded. Separation and sequencing can then be performed using instrumentation and conditions known in the art.

Development of a thermo-gelling separation and sequencing matrix, in accordance with this invention, will find important commercial applications. The present materials offer long read length, excellent DNA resolution, low viscosity near room temperature, and "self-coating" properties. With optimization for a given system, such matrices provide DNA sequencing performance superior to currently commercial available counterparts, and be uniquely easy to implement and use in microchannel electrophoresis systems. Further, the materials and methods of this invention could also be utilized in both capillary array electrophoresis systems and in multi-channel microfluidic DNA sequencing chips.

We claim:
1. A poly-N-alkoxyalkylacrylamide compound comprising a copolymer of N-methoxyethylacrylamide and N-ethoxyethylacrylamide, said compound having a weight-average molar-mass from about 2 MDa to about 5 MDa.
2. The compound of claim 1 comprising up to about 25 weight percent N-ethoxyethylacrylamide.
3. The compound of claim 2 comprising about 10 weight percent of N-ethoxyethylacrylamide.

* * * * *

UNITED STATES PATENT AND TRADEMARK OFFICE
CERTIFICATE OF CORRECTION

| | | |
|---|---|---|
| PATENT NO. | : 8,211,991 B1 | |
| APPLICATION NO. | : 12/699294 | |
| DATED | : July 3, 2012 | |
| INVENTOR(S) | : Annelise E. Barron and Cheuk-Wai Kan | |

It is certified that error appears in the above-identified patent and that said Letters Patent is hereby corrected as shown below:

Column 1, Lines 10-14:

"The United States government has certain rights to this invention pursuant to Grant
No. 1 R01 HG 019770-01 from the National Institutes of Health and Grant No. DMR-0076097
from the National Science Foundation, to Northwestern University." should be -- This invention was made with government support under 1 R01 HG 019770-01 awarded by
the National Institutes of Health and DMR-0076097 awarded by the National Science
Foundation. The government has certain rights in the invention. --

Signed and Sealed this
Sixteenth Day of October, 2012

David J. Kappos
*Director of the United States Patent and Trademark Office*